United States Patent [19]
Cameron et al.

[11] 3,847,241

[45] Nov. 12, 1974

[54] FUEL TANK AND HYDRAULIC RESERVOIR ARRANGEMENT

[75] Inventors: Thomas M. Cameron, Waukegan, Ill.; John L. Kellogg, Radcliff, Ky.

[73] Assignee: International Harvester, Chicago, Ill.

[22] Filed: May 17, 1973

[21] Appl. No.: 361,105

[52] U.S. Cl. ................. 180/54 R, 220/20, 280/5 A
[51] Int. Cl. ............................................ B60k 15/02
[58] Field of Search ...... 180/54 A, 54 R, 54 D, 1 F, 180/1 R, 66 R, 69 R, 54 E; 280/5 A, 5 R; 220/20

[56] References Cited
UNITED STATES PATENTS
| | | | |
|---|---|---|---|
| 1,970,724 | 8/1934 | Arnold | 280/5 A |
| 2,393,324 | 1/1946 | Joy | 180/66 R X |
| 2,402,449 | 6/1946 | Rockwell | 180/1 R |

FOREIGN PATENTS OR APPLICATIONS
| | | | |
|---|---|---|---|
| 521,069 | 3/1955 | Italy | 280/5 A |

*Primary Examiner*—David Schonberg
*Assistant Examiner*—Milton L. Smith
*Attorney, Agent, or Firm*—Ronald C. Kamp; Floyd B. Harman

[57] ABSTRACT

A fuel tank and hydraulic reservoir are provided with a contiguous outer wrap with spaced side walls to define an air baffle therebetween. The baffle is an open channel communicating with the engine compartment so that air flows through the channel as a result of the pressure differential created by the engine driven fan within the compartment.

8 Claims, 4 Drawing Figures

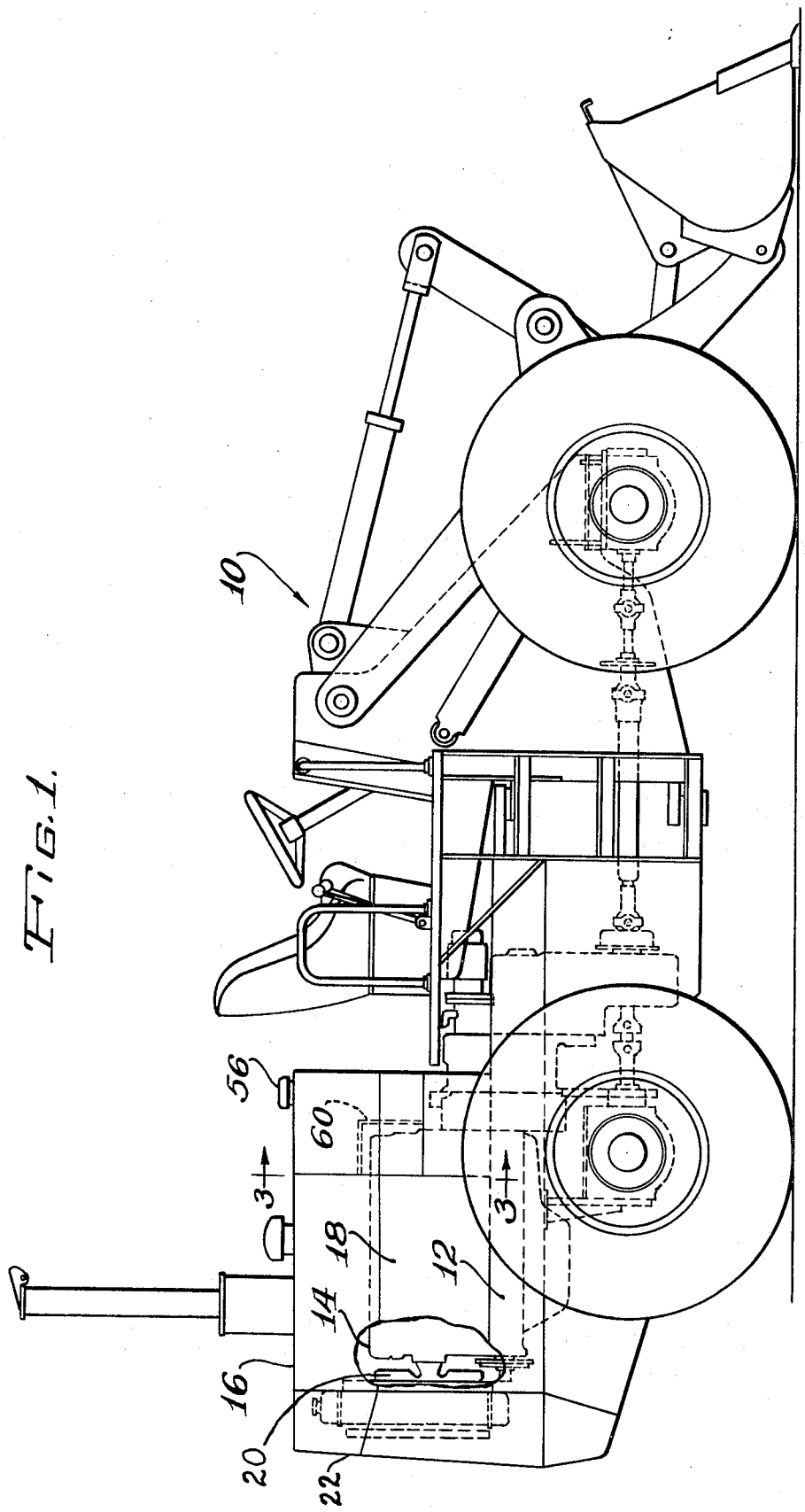

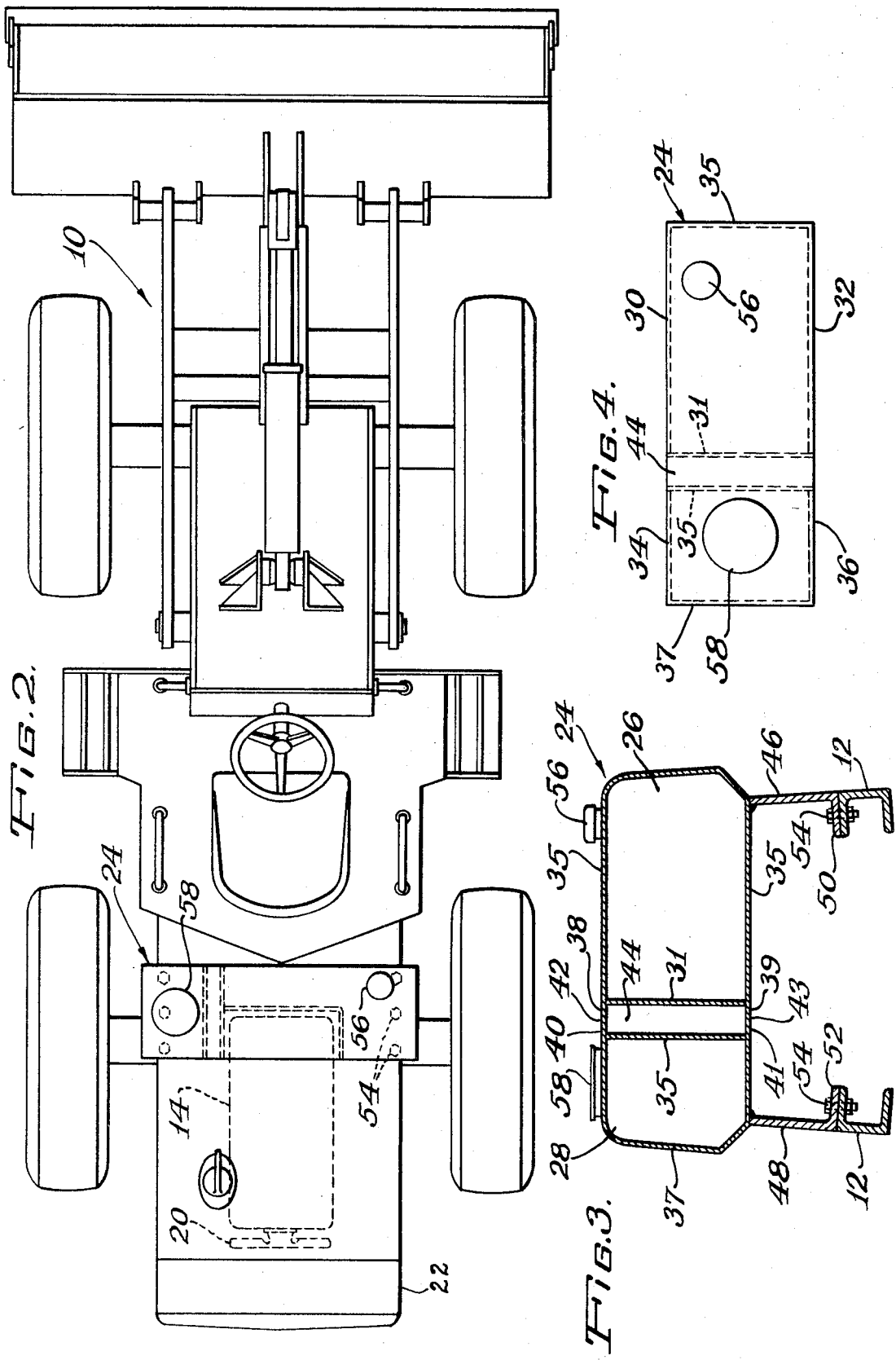

3,847,241

FUEL TANK AND HYDRAULIC RESERVOIR ARRANGEMENT

BACKGROUND AND SUMMARY OF THE INVENTION

On vehicles having hydraulically actuated equipment, a reservoir for the hydraulic fluid is necessary. This reservoir becomes a large heat source because the hydraulic fluid is heated when pressurized by the hydraulic pump driven by the power plant or engine on the vehicle. A vehicle of this type also must be provided with a tank for holding the engine fuel. Due to the flammable nature of fuel, it has been the practice in the prior art to physically separate the fuel tank from high temperature sources, such as the hydraulic reservoir. Such separation, while minimizing the exposure of the fuel to high temperatures, creates additional problems or disadvantages. For example, the fuel tank, due to space limitations on the vehicle, is frequently forced to a location at the extreme rear or front of the vehicle, and in addition, frequently must be placed at a relatively low elevation, such locations increasing the possibility of rupturing the tank in relatively minor collisions or in passing over obstacles on the ground. Another disadvantage inherent with the wide physical separation of the fuel tank and hydraulic reservoir is the necessity of providing individual and separate support means for the two liquid receptacles. That is, the weight of the fuel tank and the hydraulic reservoir, when each is filled to capacity, is sufficiently great as to necessitate various support means capable of carrying this weight and to transfer the structural load imposed thereby to the vehicle frame.

Another example of the disadvantage of wide separation of fuel tank and hydraulic reservoir is the compromise on optimum location thereof with regard to desired weight distribution. That is, the weight of the fuel and the hydraulic fluid should desirably be located to assist the tractive effort of the vehicle, but the optimum positioning for such tractive effort must be compromised in order to achieve wide physical separation between the two liquid receptacles.

It is therefore an object of the present invntion to provide a mounting arrangement for a fuel tank and hydraulic reservoir which permits positioning the two in relatively close proximity and which minimizes the amount of heat transferred from the high temperature hydraulic reservoir to the fuel tank.

It is another object of this invention to provide a compact unitary structure for a fuel tank and hydraulic reservoir which is economical, which minimizes heat transfer therebetween, and which permits more desirable location thereof with regard to the drive axle.

Still a further object of this invention is to provide a mounting arrangement for a fuel tank and hydraulic reservoir which is economical, which utilizes a minimum of structural supports, and which is relatively easy to manufacture and assemble.

These and other objects and many of the attended advantages of the present invention will become readily apparent upon a perusal of the following description when read in conjunction with the accompanying drawings, wherein:

FIG. 1 is a side elevational view of a vehicle incorporating the present invention;

FIG. 2 is a top plan view of the vehicle shown in FIG. 1;

FIG. 3 is a cross sectional view taken on line 3—3 of FIG. 1, but with parts thereof broken away or eliminated for clarity; and FIG. 4 is a top plan view of the structure shown in FIG. 3.

DESCRIPTION OF A PREFERRED EMBODIMENT

Referring now to FIGS. 1 and 2 of the drawings, there is shown a vehicle, indicated generally at 10, having main frame members 12 supporting a power plant or engine 14. The frame members 12 cooperate with various shrouds, such as engine shroud 16, panel members, such as engine side panel 18, and various other structural members on the vehicle to form a semienclosed compartment for the engine 14. A fan 20 is driven by the engine 14 and creates a pressure differential between the pressure within the engine compartment and the surrounding atmosphere. In the embodiment shown, the fan 20 expels air from the engine compartment through the grille housing 22 at one end thereof. At the other end of the engine compartment, a compact fuel tank and hydraulic reservoir structure, indicated generally at 24, cooperates with adjacent members to form the aforementioned engine compartment. The structure 24 comprises a fuel tank 26 and a hydraulic reservoir 28. The fuel tank 26 has side walls or vertically extending members 30, 31 and 32. These side walls are secured to a protective wrap member 35, which forms the top, bottom and one side wall of the tank 26. The hydraulic reservoir 28 is formed in a similar manner, the side walls 34, 35 and 36 being secured to a protective wrap member 37. The wrap member 35 for the fuel tank extends beyond the inner side wall 31 of the fuel tank a short distance on both the top and the bottom, as indicated at 38 and 39. Similarly, the wrap member 37 for the hydraulic reservoir 28 extends beyond the inner side wall 35 a short distance at both the top and bottom as indicated at 40 and 41. The upper or top extensions 38 and 40 are joined by a weld 42, as is the lower or bottom extensions 39 and 41 by the weld 43. With the two wrap members 35 and 37 thus joined a unitary structure is defined with the inner side walls 31 and 35 being oriented parallel to each other and spaced a short distance apart to define a channel 44.

A pair of legs 46 and 48 are secured respectively to the fuel tank 26 and the hydraulic reservoir 28 and are provided with inward extending flanges 50 and 52. The entire unitary structure 24 is mounted on and secured to the vehicle by any convenient means, such as by passing bolts 54 through holes in the flange 52 and mating surfaces on the frame member 12. By properly dimensioning the legs 46, 48, the upper surfaces of the two wrap members 35 and 37 can be made to be contiguous with the upper surface of the shroud member 16. Thus, the wrap members 35 and 37 perform a multitude of functions. They are structural members defining the two liquid receptacles, are compatible with the esthetic appearance of the vehicle and form a portion of the exterior design obviating the usual practice of concealing these tanks by encasing them in decorative sheet metal, form a portion of the means for supporting both tanks on the vehicle and define a channel or air baffle between the hydraulic reservoir and the fuel tank to protect the fuel tank from the high temperature oil present in the reservoir when the vehicle is being operated. In order to optimize the esthetic attributes of the structure 24, the wrap members can be formed to unique shapes, such as illustrated in FIG. 3 with the side walls 30, 32, 34 and 36 being formed compatible therewith, and the legs 46 and 48 can be unitary and continuous and shaped to be contiguous with adjacent vehicle members, such as the outer surface of the frame members 12. To further optimize appearance, the upper weld 42 can be ground level with the surfaces of the wrap members 37 and 35 so that a smooth flat appearance is provided. Appropriate capped openings 56 and 58 are provided respectively in the fuel tank 26 and the hydraulic reservoir 28 to facilitate filling the fuel tank and servicing the reservoir and any filter which may be located therein.

In some cases it may be necessary to provide clearance between the structure 24 and vehicle components, such as the engine 14. As illustrated in FIGS. 1 and 2, this is accomplished by providing a partial side wall 60 extending from the bottom of the tank 26 and forming the wrap member 35 to follow the partial side wall 60 so that it extends up and over the engine 14.

During operation of the vehicle, the engine 14 will drive the fan 20, which as shown, exhausts air from the engine compartment, creating a lower pressure within the engine compartment than exists in the ambient atmosphere around the compartment. As a consequence of this pressure differential, air will flow between the side walls 31 and 35 through the channel 44 minimizing the transfer of heat from the relatively hot oil in the hydraulic reservoir 28 to the fuel in the fuel tank 26. Some heat will be conducted through the connection of the wrap members 35 and 37, but this will be minimized because of the flow of air past these metal parts. In addition, since the hydraulic reservoir is not encased in sheet metal for decorative purposes, transfer of heat to the ambient atmosphere from the reservoir itself is maximized, thereby maintaining the oil temperature in the hydraulic reservoir at a lower level than would normally be encountered when such decorative sheet metal is utilized. It should also be apparent from the foregoing that the unitary structure functions as a support means and eliminates the need to provide bulkheads and other conventional attachment and protective means for these liquid receptacles.

While a preferred embodiment of the invention has been shown and illustrated herein, it will be understood that various changes and modifications may be made without departing from the spirit of the invention as defined by the scope of the appended claims.

What is claimed is:

1. A compact arrangement for mounting the fuel tank and hydraulic reservoir on a vehicle comprising:

a vehicle frame;
an engine mounted on said frame;
shroud means partially surrounding the engine and forming a semi-enclosed engine compartment;
a fan driven by the engine and capable of creating a pressure differential between the compartment and ambient pressures;
means mounting said fuel tank and said hydraulic reservoir on said frame adjacent said shroud means;
said tank and reservoir having facing side members; said members being spaced apart to form an open channel;
one end of said channel communicating with the interior of said compartment and the other end of said channel being exposed to ambient atmosphere; whereby flow of air through the channel is created by said pressure differential to minimize the transfer of heat between said reservoir and said tank.

2. A compact arrangement according to claim 1, wherein said tank and reservoir each comprises:
a pair of side walls engageable with and secured to the associated side member;
a wrap member is secured to said side walls and said side member to form the bottom, outer wall, and top of the respective tank and reservoir;
each wrap member extending beyond the associated side member toward the other side member; and
means securing the wrap members together to form said channel and to provide a unitary structure.

3. A compact arrangement according to claim 2, wherein said mounting means comprises:
a pair of legs secured to said structure and extending downward therefrom; and
fastening means for detachably securing the lower end of said legs to said vehicle frame.

4. A compact arrangement according to claim 3, wherein one of said legs is secured to the wrap member for the fuel tank and the other of said legs is secured to the wrap mamber for the reservoir.

5. A compact arrangement according to claim 4, wherein the upper surfaces of said wrap members are contiguous both with each other and with the upper surface of said shroud means.

6. A unitary fuel tank and hydraulic reservoir structure comprising:
a tank side member;
a pair of tank side walls secured to the tank side member;
a tank wrap member secured to the outer edges of said tank side walls and member;
said tank wrap member having upper and lower extensions;
a reservoir side member;
a pair of reservoir side walls secured to the reservoir side member;
a reservoir wrap member secured to the outer edges of said reservoir side walls and member;
said reservoir wrap member having upper and lower extensions;
means securing the corresponding extensions together;
said extensions and said side members forming an open channel; and
fan means for causing air to flow through said channel.

7. A unitary structure according to claim 6 wherein said unitary structure is mounted on a vehicle having an engine and said fan means consists of a conventional engine-driven cooling fan.

8. A unitary structure according to claim 7, wherein said engine is partially enclosed by shroud means and said unitary structure cooperates with said shroud means to further enclose said engine.

* * * * *